(12) United States Patent
Chai et al.

(10) Patent No.: US 9,669,437 B1
(45) Date of Patent: Jun. 6, 2017

(54) METHOD FOR SCAVENGING AROMATIC HYDROCARBONS, CRUDE PETROLEUM AND/OR A PETROLEUM REFINED PRODUCT

(71) Applicants: Wan-Lan Chai, Taoyuan (TW); Jing-Dong Chow, Taoyuan (TW); Jen-Chieh Pang, Taoyuan (TW); Yi-Cheng Ho, Taoyuan (TW)

(72) Inventors: Wan-Lan Chai, Taoyuan (TW); Jing-Dong Chow, Taoyuan (TW); Jen-Chieh Pang, Taoyuan (TW); Yi-Cheng Ho, Taoyuan (TW)

( * ) Notice: Subject to any disclaimer, the term of this patent is extended or adjusted under 35 U.S.C. 154(b) by 0 days.

(21) Appl. No.: 14/954,458

(22) Filed: Nov. 30, 2015

(51) Int. Cl.
| | |
|---|---|
| *B09C 1/10* | (2006.01) |
| *C02F 3/34* | (2006.01) |
| *B09C 1/00* | (2006.01) |
| *C02F 101/32* | (2006.01) |
| *C02F 103/06* | (2006.01) |
| *C02F 103/00* | (2006.01) |
| *C02F 103/34* | (2006.01) |

(52) U.S. Cl.
CPC .............. *B09C 1/10* (2013.01); *B09C 1/002* (2013.01); *C02F 3/34* (2013.01); *B09C 2101/00* (2013.01); *C02F 2101/322* (2013.01); *C02F 2103/007* (2013.01); *C02F 2103/06* (2013.01); *C02F 2103/34* (2013.01)

(58) Field of Classification Search
None
See application file for complete search history.

(56) References Cited

PUBLICATIONS

Zhang et al., Antonie van Leeuwenhoek (2015) 107, pp. 1181-1187.*

* cited by examiner

*Primary Examiner* — Jim Ketter
(74) *Attorney, Agent, or Firm* — Cesari and McKenna, LLP

(57) ABSTRACT

A method for scavenging aromatic hydrocarbons present in a contaminated substrate includes treating the contaminated substrate with *Pseudomonas taoyuanensis* S03 deposited in DSMZ under an accession number DSM 32185, the aromatic hydrocarbons are benzene, naphthalene, toluene, ethylbezene or xylene. A method for scavenging crude petroleum or a refined product thereof present in a contaminated substrate includes treating the contaminated substrate with *Pseudomonas taoyuanensis* S03 deposited in DSMZ under an accession number DSM 32185, such that the crude petroleum or the refined product thereof is emulsified by *Pseudomonas taoyuanensis* S03.

8 Claims, 6 Drawing Sheets

```
attgaacgct ggcggcaggc ctaacacatg caagtcgagc ggatgagagg agcttgctcc
ttgatttagc ggcggacggg tgagtaatgc ctaggaatct gcctggtggt gggggataac
gttccgaaag gaacgctaat accgcatacg tcctacggga gaaagcgggg gatcttcgga
cctcgcgcca ttagatgagc ctaggtcgga ttagctagtt ggtgaggtaa cggctcacca
aggcgacgat ccgtaactgg tctgagagga tgatcagtca cactggaact gagacacggt
ccagactcct acgggaggca gcagtgggga atattggaca atgggcgaaa gcctgatcca
gccatgccgc gtgtgtgaag aaggtcttcg gattgtaaag cactttaagt tgggaggaag
ggtattcacc taatacgtga gtattttgac gttaccgaca gaataagcac cggctaactt
cgtgccagca gccgcggtaa tacgaagggt gcaagcgtta atcggaatta ctgggcgtaa
agcgcgcgta ggtggttcgt taagttggat gtgaaagccc cgggctcaac ctgggaactg
catccaaaac tggcgagcta gagtacggta gagggtggtg gaatttcctg tgtagcggtg
aaatgcgtag atataggaag gaacaccagt ggcgaaggcg accacctgga ctgatactga
cactgaggtg cgaaagcgtg gggagcaaac aggattagat accctggtag tccacgccgt
aaacgatgtc aactagccgt tggaatcctt gagattttag tggcgcagct aacgcattaa
gttgaccgcc tggggagtac ggccgcaagg ttaaaactca aatgaattga cggggcccg
cacaagcggt ggagcatgtg gtttaattcg aagcaacgcg aagaaccta cctggccttg
acatgctgag aactttccag agatggattg gtgccttcgg gaactcagac acaggtgctg
catggctgtc gtcagctcgt gtcgtgagat gttgggttaa gtcccgtaac gagcgcaacc
cttgtcctta gttaccagca cgtgatggtg ggcactctaa ggagactgcc ggtgacaaac
cggaggaagg tggggatgac gtcaagtcat catggccctt acggccaggg ctacacacgt
gctacaatgg tcggtacaaa gggttgccaa gccgcgaggt ggagctaatc ccataaaacc
gatcgtagtc cggatcgcag tctgcaactc gactgcgtga agtcggaatc gctagtaatc
gtgaatcaga atgtcacggt gaatacgttc ccgggccttg tacacaccgc ccgtcacacc
atgggagtgg gttgctccag aagtagctag tctaaccttc gggggacgg ttaccacgga
gtgattcatg actggggtga agtcgtaaca aggtagccgt aggggaacc
```

FIG.1 tgcatggcgt gccccaggcg ccgctggccg ccgttggtga caccgaaggc accggcacgc
agattcattt caagccctcg gaagaaacct tccacaatat ccactttagc tgggacatcc
tggccaagcg ccttcgcgaa ctgtccttcc tcaactccgg cgtcggcatc ctgctcaagg
acgaacgcag cggcaaggaa gaactgttca agtacgaggg cggtctgcgc gccttcgtcg
agtacctcaa ccacaacaag accacggtca accaggtgtt ccacttcaac gtgcagcgcg
acgatggcgt cggcgtggaa gtggccctgc agtggaacga cagcttcaac gagaacctgt
tgtgcttcac caacaacatt ccccagcgcg acggcggcac ccacctcgcc ggcttccgct
cggcgctgac gcgtaacctc aacacctata tcgagcagga aggcctggcc aagaagttca
aggtcagcac caccggcgac gatgcccgcg aaggcctgac cgcgatcatc tcggtcaagg
tgccggaccc gaaattcagc tcgcagacca aggacaagct ggtctccagc gaagtgaaga
ccgcggtcga acaggaaatg ggcaagtact cgccgactt cctgctggaa atcccaacg
aagccaaggc cgtggtcggc aagatgatcg acgctgcccg cgcccgcgaa gccgcgcgca
aggcccgcga gatgacccgc cgcaagggcg cgctggatat cgccgggctg cccggcaagc
tggccgactg ccaggaaaag gacccggcgc tgtccgaact ctacatagtg gagggtgact
ccgcgggcgg ttctgccaag cagggccgca accgcaggac ccaggcgatc ctgccgctca
agggcaagat cctcaacgtg gaaaaagccc gcttcgacaa gatgctctcc tcccaggaag
tcggcaccct gatcaccgcg ctcggctgcg gtatc
```

FIG.2

… # METHOD FOR SCAVENGING AROMATIC HYDROCARBONS, CRUDE PETROLEUM AND/OR A PETROLEUM REFINED PRODUCT

FIELD

The disclosure relates to a method for scavenging aromatic hydrocarbons, crude petroleum or a petroleum refined product using a *Pseudomonas taoyuanensis* S03 isolate that was deposited in the Deutsche Sammlung von Mikroorganismen and Zellkulturen (DSMZ) under an accession number DSM 32185.

BACKGROUND

Aromatic hydrocarbons, arenes, are types of hydrocarbon compounds having one or more benzene rings, and may be classified into monocyclic aromatic hydrocarbons (MAHs) and polycyclic aromatic hydrocarbons (PAHs) based on the number of benzene rings. Aromatic hydrocarbons are generally present in crude petroleum, petroleum refined products (e.g., diesel, heavy oil, and gasoline), and industrial solvents, and often used as starting materials for the manufacture of pharmaceuticals, agrochemicals, explosives, and many daily use products. However, aromatic hydrocarbons have stable and hardly degradable structures with high melting and boiling points. When released, aromatic hydrocarbons easily accumulate within and can be harmful to humans and the ecological environment.

The MAHs compounds benzene, toluene, ethylbenzene, and xylene (BTEX) are some of the most common groundwater contaminants and soil contaminants. Among the BTEX compounds, benzene often receives more attention due to its reported carcinogenicity. Benzene ($C_6H_6$), the simplest MAH, is often used as a chemical solvent or for the preparation of benzene derivatives in the chemical industry. Upon entering the human body, through skin or eye contact, inhalation, or oral routes, benzene could inhibit the central nervous system (CNS) and cause symptoms such as sleepiness, dizziness, headache, nausea, etc. Long-term contact with benzene could adversely influence the formation of red blood cells, white blood cells and blood platelets, and likely cause leukemia.

Naphthalene ($C_{10}H_8$) is the simplest PAH, composed of two fused benzene rings, and widely used for the production of dyestuffs, resins, solvents, disinfectants, insecticides, preservatives, mothproofing agents, etc. After entering the human body, naphthalene could cause symptoms such as haemolytic anaemia, nausea, vomiting, diarrhea, jaundice, liver or kidney damage, etc.

Because the presence of benzene and/or naphthalene in the environment poses a threat to human health and causes damage to ecological environment, much effort has been made to provide effective methods for the treatment of environmental pollutants. Current methods for the treatment of environmental pollutants include solidification, removal, incineration, activated carbon adsorption, catalytic reduction, photolysis, bioremediation, etc.

Bioremediation is a technique that utilizes the biodegradative activities of microorganisms to remove environmental pollutants and recalcitrant xenobiotics. Advantages of bioremediation include its low cost, lack of toxic by-products and secondary pollution generated during the degradation of the environmental pollutants, in situ operation, etc. Therefore, bioremediation has been widely applied to the remediation of contaminated sites. Bioaugmentation, a process of adding microorganisms with biodegradative activities to contaminated environments for the purpose of degrading pollutants, is particularly well-received among bioremediation techniques. However, certain characteristics of aromatic hydrocarbons, e.g., the low water solubility and strong sorption to soil, could adversely influence their bioavailability to microorganisms capable of aromatic hydrocarbon degradation, thereby limiting the degradation rate of aromatic hydrocarbons. Accordingly, the addition of microorganisms with emulsifying activity to the aromatic hydrocarbon-contaminated environments increases desorption rates and apparent solubility of aromatic hydrocarbons in an aqueous phase, resulting in increased bioavailability and degradation rate of aromatic hydrocarbons.

In the event that indigenous microorganisms are unable to effectively scavenge aromatic hydrocarbons, bioaugmentation may be the only way to achieve bioremediation. Therefore, it has become a goal for researchers in this field to isolate and screen microorganisms suitable for bioremediation.

Many bacterial strains with emulsifying activity and/or benzene- and/or naphthalene-scavenging ability for benzene and/or naphthalene have been isolated from contaminated environments, and mostly belong to *Pseudomonas* spp., *Pseudoxanthomonas* spp., *Alicycliphilus* spp., *Burkholderia* spp., *Ralstonia* spp., *Achromobacter* spp., *Hydrogenophaga* spp., *Rhodococcus* spp., *Arthrobacter* spp., *Alcaligenes* spp., *Micrococcus* spp., etc. (Jeong Myeong Kim et al. (2008), *Applied and Environmental Microbiology*, 74:7313-7320; Shuguang Xie et al. (2011), *Biodegradation*, 22:71-81; R. C. John et al. (2012), *Bulletin of Environmental Contamination and Toxicology*, 88:1014-1019). For example, CN 103045502 A discloses a *Rhodococcus erythoropolis* strain T7-3 (CGMCC No. 6104) isolated from petroleum-contaminated seabed soil samples, which was found to be effective in the emulsification and/or degradation of crude petroleum and/or petroleum hydrocarbons (including benzene and xylene). The *Rhodococcus erythoropolis* strain T7-3 is expected to be useful in bioremediation of petroleum-contaminated area of the sea. CN 1519312 A discloses a *Rhodococcus ruber* strain Em CGMCC No. 0868 isolated from crude petroleum-contaminated soils, which was found to be effective in the emulsification and/or degradation of kerosene and petroleum hydrocarbons such as benzene, naphthalene, anthracene, phenanthrene, and pyrene. The *Rhodococcus ruber* strain Em CGMCC No. 0868 is expected to be useful in oily wastewater treatment and bioremediation of petroleum-contaminated soils.

In E. Deziel et al. (1996), *Appl. Environ. Microbiol.*, 62:1908-1912, E. Deziel et al. isolated twenty-three PAH-degrading bacterial isolates from a sandpit that had previosuly received oil refinery wastes, wherein *Pseudomonas aeruginosa* 19SJ was found to be able to produce large amounts of glycolipid using naphthalene or phenanthrene as the sole substrate. Furthermore, via glycolipid production, *Pseudomonas aeruginosa* 19SJ exhibits emulsifying activity that could increase apparent solubility of naphthalene, resulting in enhanced naphthalene degradation and utilization, and in turn, further promotion of glycolipid production. Therefore, production of surface-active compounds by bacteria is likely a part of their strategy for growing on poorly available substrates. For these reasons, *Pseudomonas aeruginosa* 19SJ is expected to be useful in bioremediation of environments contaminated with benzene and/or naphthalene.

In Eun Young Lee et al. (2011), *International Proceedings of Chemical, Biological & Environmental Engineering*, 20:37-41, Eun Young Lee et al. isolated *Pseudomonas putida* AY-10 from the rhizosphere of wastewater treatment reed. *Pseudomonas putida* AY-10 is able to grow on mediums with benzene, toluene, ethylbenzene, or xylene as the sole carbon source, and also completely degrade benzene, toluene, ethylbenzene, and xylene. Therefore, *Pseudomonas putida* AY-10 is expected to be useful in bioremediation of BTEX-contaminated environments.

Despite the microorganisms described in the above prior art, the Inventors remain committed in their efforts to screen microorganisms having emulsifying activity as well as benzene- and/or naphthalene-scavenging ability for use in environmental protection. During their research efforts, the Inventors unexpectedly isolated a new bacterial isolate, *Pseudomonas taoyuanensis* S03, form soils contaminated with benzene and/or naphthalene. The bacterial isolate is phylogenetically different from other bacterial species of *Pseudomonas* that have been published, and possesses great emulsifying activity against heavy oil and diesel, as well as benzene- and/or naphthalene-scavenging ability. Therefore, the isolate is expected to be useful in the remediation of environments contaminated with crude petroleum, petroleum refined products, benzene, and/or naphthalene.

SUMMARY

Therefore, according to a first aspect of the disclosure, a method for scavenging aromatic hydrocarbons present in a contaminated substrate includes treating the contaminated substrate with *Pseudomonas taoyuanensis* S03 deposited in DSMZ under an accession number DSM 32185, such that the aromatic hydrocarbons present in the contaminated substrate is degraded or desorbed from the contaminated substrate by the *Pseudomonas taoyuanensis* S03, wherein the aromatic hydrocarbons are selected from the group consisting of benzene, naphthalene, toluene, ethylbezene, xylene, and combinations thereof.

According to a second aspect of the disclosure, a method for scavenging crude petroleum or a refined product thereof present in a contaminated substrate, includes treating the contaminated substrate with the *Pseudomonas taoyuanensis* S03 deposited in DSMZ under an accession number DSM 32185, such that the crude petroleum or the refined product thereof is emulsified by the *Pseudomonas taoyuanensis* S03.

BRIEF DESCRIPTION OF THE DRAWINGS

Other features and advantages of the disclosure will become apparent in the following detailed description of the embodiments with reference to the accompanying drawings, of which:

FIG. 1 shows the partial 16S rDNA sequence of *Pseudomonas taoyuanensis* S03 (SEQ ID NO: 1) of the disclosure;

FIG. 2 shows the partial gyrB gene sequence of *Pseudomonas taoyuanensis* S03 (SEQ ID NO: 2) of the disclosure;

DETAILED DESCRIPTION

Figure 3:
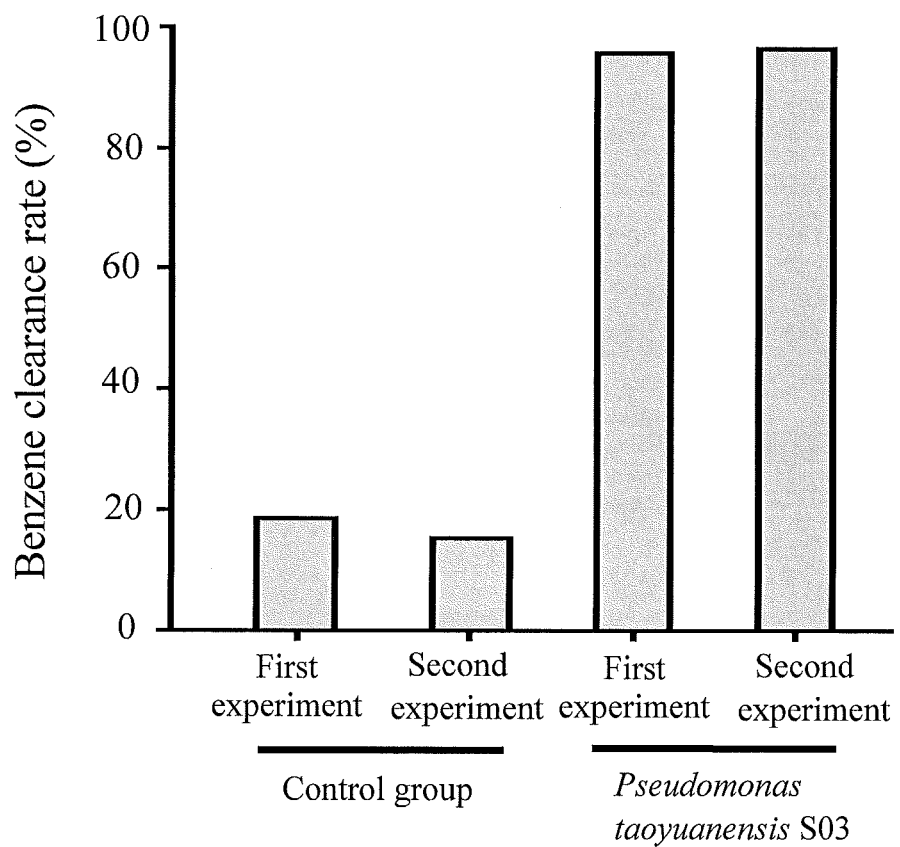
FIG. 3 shows the benzene clearance rate of *Pseudomonas taoyuanensis* S03 for a benzene-containing soil sample, wherein the control group represents treatment of a benzene-containing soil sample without using *Pseudomonas taoyuanensis* S03.

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprise" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

In order to screen microorganisms suitable for bioremediation, the Inventors isolated 35 purified bacterial isolates from diesel-contaminated soil at a remediation site. Each of the bacterial isolates was inoculated in heavy oil to analyze the Emulsification index E24 thereof. Bacterial isolate S03 is found to have excellent emulsifying activity for heavy oil. Based on the results of characteristics identification of the bacterial isolate S03 and referring to Satoshi Yamamoto et al. (1995), *Applied and Environmental Microbiology*, 61:1104-1109 and Li-Ting Wang et al. (2010), *International Journal of Systematic and Evolutionary Microbiology*, 60:2094-2098, the bacterial isolate S03 is determined to be a novel *Pseudomonas* species, and was named as *Pseudomonas taoyuanensis* S03. *Pseudomonas taoyuanensis* S03 was deposited under the terms of the Budapest Treaty in the International Strain Depositary Leibniz Institute Deutsche Sammlung von Mikroorganismen and Zellkulturen (DSMZ), Inhoffenstr. 7 B, D-38124 Braunschweig GERMANY, under accession number DSM 32185 on Oct. 14, 2015.

Through further experiments, *Pseudomonas taoyuanensis* S03 was found to be effective in emulsifying super diesel.

Accordingly, the disclosure provides a method for scavenging crude petroleum or a refined product thereof present in a contaminated substrate, comprising treating the contaminated substrate with the *Pseudomonas taoyuanensis* S03, such that the crude petroleum or the refined product thereof is emulsified by the *Pseudomonas taoyuanensis* S03.

As used herein, the term "emulsify" refers to emulsification of a substance having low water solubility that results in a change of interfacial tension between the substance and an aqueous phase so as to allow the substance to be dispersed in the aqueous phase in the form of fine droplets or particles, thereby forming a heterogeneous dispersion system.

As used herein, the term "crude petroleum" refers to untreated or unrefined oil (i.e., crude oil) found beneath the earth's surface, which is a complex mixture containing hydrocarbons of various molecular weights (including aliphatic hydrocarbons, cyclic hydrocarbons, and aromatic hydrocarbons) and other organic compounds.

The term "refined product of the crude petroleum" refers to petroleum refined product, refined petroleum, or petroleum product as well known to a skilled artisan. According to the disclosure, the refined product of the crude petroleum includes, but is not limited to, heavy oil, diesel, kerosene, gasoline, hydraulic oil, and lubricating oil.

In an embodiment of the disclosure, the refined product of the crude petroleum is heavy oil. In another embodiment of the disclosure, the refined product of the crude petroleum is diesel.

Through further experiments, *Pseudomonas taoyuanensis* S03 was found to be effective in scavenging benzene and naphthalene present in soil by desorption and/or degradation.

Accordingly, the disclosure also provides a method for scavenging aromatic hydrocarbons present in a contaminated substrate, comprising treating the contaminated substrate with the *Pseudomonas taoyuanensis* S03, such that the aromatic hydrocarbons present in the contaminated substrate is degraded or desorbed from the contaminated substrate by the *Pseudomonas taoyuanensis* S03, wherein the aromatic hydrocarbons are selected from the group consisting of benzene, naphthalene, toluene, ethylbezene, xylene, and combinations thereof.

As used herein, the term "desorb" refers to release of a compound from a contaminated substrate by breaking the adhesive force therebetween.

According to the disclosure, the contaminated substrate may be a solid or liquid environmental substrate, which includes, but is not limited to, soil, sludge, sediment, aquifer, and water. Preferably, the contaminated substrate is selected from the group consisting of agricultural land (e.g., plowland and orchard land), grazing grassland, woodland, gas station land, industrial land, well water, an aquaculture pond, water reservoir, ground water, river water, lake water, seawater, industrial waste water, domestic sewage, and silt.

According to the disclosure, *Pseudomonas taoyuanensis* S03 or sub-cultured offspring thereof of the present disclosure may be used to prepare a microbial agent using technology well known to those skilled in the art. The microbial agent may be used for bioremediation of a substrate that is contaminated with crude petroleum or a refined product thereof. The microbial agent may also be used for bioremediation of a substrate that is contaminated with benzene, naphthalene, toluene, ethylbezene, or xylene.

According to the disclosure, the microbial agent may additionally include at least one microorganism capable of scavenging monocyclic and/or polycyclic aromatic hydrocarbons.

The microorganisms capable of scavenging monocyclic aromatic hydrocarbons include, but are not limited to, *Pseudomonas* spp., *Pseudoxanthomonas* spp., *Alicycliphilus* spp., *Burkholderia* spp., *Ralstonia* spp., *Achromobacter* spp., *Hydrogenophaga* spp., *Rhodococcus* spp., and *Arthrobacter* spp. Examples of the microorganisms capable of scavenging monocyclic aromatic hydrocarbons include *Rhodococcus erythoropolis* T7-3, *Rhodococcus ruber* Em CGMCC No. 0868, and *Pseudomonas putida* AY-10.

The microorganisms capable of scavenging polycyclic aromatic hydrocarbons include, but are not limited to, *Pseudomonas* spp., *Rhodococcus* spp., *Arthrobacter* spp., *Acinetobacter* spp., *Flavobacterium* spp., *Alcaligenes* spp., *Micrococcus* spp., and *Corynebacterium* spp. Examples of the microorganisms capable of scavenging polycyclic aromatic hydrocarbons include *Rhodococcus ruber* Em CGMCC No. 0868 and *Pseudomonas aeruginosa* 19SJ.

According to the disclosure, the microbial agent may optionally include a nutrient that promotes microbial growth, which includes, but is not limited to, glycerol, riboflavin, casein, polypeptone, meat extract, soybean cake, yeast extract, cellulose, glucose, corn extract, whey powder, starch, vitamin (such as thiamine, biotin, nicotinic acid amide, and calcium panthotenate), and enzyme (such as amylase, protease, and lipase).

According to the disclosure, the microbial agent may be manufactured into a suitable form using technology well known to those skilled in the art, which includes, but is not limited to, culture solution, suspension, granule, powder, tablet, pill, capsule, slurry, and the like. In addition, the microbial agent may also be immobilized on an insoluble support for further application.

According to the disclosure, the microbial agent may additionally include a biocompatible carrier.

In an embodiment of the microbial agent of the disclosure, *Pseudomonas taoyuanensis* S03 is entrapped in the biocompatible carrier. The biocompatible carrier includes, but is not limited to, silica gel, starch, agar, chitin, chitosan, polyvinyl alcohol, polylactic acid, alginic acid, polyacrylamide, carrageenan, agarose, gelatin, cellulose, cellulose acetate, dextran, and collagen.

In another embodiment of the microbial agent of the disclosure, *Pseudomonas taoyuanensis* S03 is supported on the biocompatible carrier. The biocompatible carrier includes, but is not limited to, glass, ceramic, metal oxide, activated carbon, kaolinite, bentonite, zeolite, alumina, anthracite, glutaraldehyde, polyacrylic acid, polyurethane, polyvinyl chloride, ion exchange resin, epoxy resin, photosetting resin, polyester, and polystyrene.

According to the disclosure, the microbial agent may also be used to manufacture a bioreactor or device for use in scavenging crude petroleum or a refined product thereof using technology well known to those skilled in the art. The bioreactor can be manufactured with reference to, for example, U.S. Pat. No. 5,279,963 A, U.S. Pat. No. 5,258,303 A, U.S. Pat. No. 5,552,051 A, U.S. Pat. No. 5,494,574 A, U.S. Pat. No. 6,030,533 A, US 2003/0008381 A1, US 2006/0270024 A1, EP 0609399 B1, EP 0867238 A3, and K. Ishii and T. Furuichi (2007), *Journal of Hazardous Materials*, 148(3):693-700.

The present disclosure will be further described by way of the following examples. However, it should be understood that the following examples are solely intended for the purpose of illustration and should not be construed as limiting the disclosure in practice.

EXAMPLES

Experimental Materials:
1. Minimal Agar Medium:
The recipe of the minimal agar medium used in the examples is shown in Table 1.

TABLE 1

| Ingredients | Amount |
| --- | --- |
| $(NH_4)_2SO_4$ | 1 g |
| $KH_2PO_4$ | 5 g |
| $MgSO_4 \cdot 7H_2O$ | 0.1 g |

TABLE 1-continued

| Ingredients | Amount |
|---|---|
| FeSO$_4$ | 0.005 g |
| Trace metal solution | 1 mL |
| Agar | 23 g |
| Deionized water | added to a final volume of 1 L |

The final pH value was adjusted to 7.0 ± 0.2.

Note:
The trace metal solution was prepared by adding 10.75 g MgO, 2 g CaCO$_3$, 4.5 g FeSO$_4$•7H$_2$O, 1.44 g ZnSO$_4$•7H$_2$O, 1.12 g MnSO$_4$•4H$_2$O, 0.25 g CuSO$_4$•5H$_2$O, 0.28 g CoSO$_4$•7H$_2$O, 0.06 g H$_3$BO$_3$, and 51.3 mL HCl in 1 L deionized water.

2. Tryptic Soy Broth (TSB):

The recipe of the tryptic soy broth used in the examples is shown in Table 2.

TABLE 2

| Ingredients | Amount |
|---|---|
| Tryptone | 17 g |
| Soytone | 3 g |
| Dextrose | 2.5 g |
| NaCl | 5 g |
| K$_2$HPO$_4$ | 2.5 g |
| Deionized water | added to a final volume of 1 L |

General Experimental Procedure:

1. Detection of the Concentration of Benzene and Naphthalene:

Benzene and naphthalene were each collected by a purge and trap device (Model 4560, OI Analytical), and concentrations thereof were detected using a gas chromatograph (GC) (Model 6890, Agilent Technologies). The operating conditions of the purge and trap device and the gas chromatograph are shown in Tables 3 and 4 respectively.

TABLE 3

| Parameter | | Benzene | Naphthalene |
|---|---|---|---|
| Purge | Temperature (° C.) | 25 | 20 |
| | Time (min) | 11 | 11 |
| Desorb | Temperature (° C.) | 210 | 180 |
| | Time (min) | 2 | 4 |
| Bake | Temperature (° C.) | 260 | 180 |
| | Time (min) | 10 | 20 |

TABLE 4

| Parameter | Benzene | Naphthalene |
|---|---|---|
| Column | VOCOL ™ capillary column having a length of 30 cm and an inner diameter of 0.53 mm and being equipped with a film with a thickness of 3 μm | SPB ™-5 capillary column having a length of 30 cm and an inner diameter of 0.53 mm and being equipped with a film wuth a thickness of 1.5 μm |
| Column oven temperature program | An initial temperature of 35° C. for 5 min, and a ramp rate of 15° C./min to 200° C., held at 200° C. for 2 min | An initial temperature of 40° C. for 2 min, a ramp rate of 15° C./min to 240° C., and a ramp rate of 10° C./min to 280° C., held at 280° C. for 2 min |

TABLE 4-continued

| Parameter | Benzene | Naphthalene |
|---|---|---|
| Carrier gas | | N$_2$ |
| Flow rate of the carrier gas | | 45 mL/min |
| Injector temperature | | 200° C. |
| Detector | | Flame ionization detector (FID) |
| Detector temperature | | 250° C. |

Furthermore, benzene (5000 μg/mL) and naphthalene (5000 μg/mL) purchased from SUPELCO were used as control standards.

Example 1. Isolation and Screening of Bacterial Isolates

A. Source and Isolation of Test Strains

A soil sample was collected from diesel-contaminated soil in a remediation site in Guanyin District, Taoyuan City (collected at a depth of about 1 meter below the soil surface).

A 10 g soil sample was sufficiently dispersed in 500 mL steriled water by ultrasonication, and the resultant suspension was incubated in a thermo shaker incubator (28° C., 50 rpm) for 7 days to obtain a bacteria culture. Subsequently, the bacteria culture was subjected to 10-fold serial dilutions so that $10^6$ to $10^8$-fold diluted bacteria culture solutions were formed. 0.1 mL of each of the diluted bacteria culture solutions was evenly applied onto a minimal agar medium, followed by cultivation at 30° C. for 48 to 72 hours. Afterwards, based on colonial morphology and the results of microscopic examination, 35 colonies were selected. Each of the colonies was applied onto a minimal agar medium by virtue of the four-quadrant streak method, followed by cultivation at 30° C. for 48 to 72 hours. After repeating the above four-quadrant streak method several times, 35 purified bacterial isolates (i.e., S01 to S35) were obtained. Each of the purified bacterial isolates was inoculated into a proper amount of TSB, followed by cultivation in a thermo shaker incubator (30° C., 50 rpm) for 48 to 72 hours to obtain a bacterial culture. The bacterial culture of each of the purified bacterial isolates was mixed with glycerol at a volume ratio of 9:1, followed by storage at −80° C. for further use.

B. Preparation of Inoculum of Each of the Purified Bacterial Isolates

Each of the purified bacterial isolates obtained from section A of this example was inoculated into 5 mL YM medium (containing 0.4% yeast extract, 1% malt extract, and 0.4% dextrose) (Difco 0711-01) at a concentration of 0.4% (v/v), followed by cultivation at 30° C. for 18 hours. Afterwards, the bacteria culture was subjected to amplification cultivation in 200 mL YM medium and 20 L YM medium so as to obtain an inoculum of the purified bacterial isolate.

C. Screening of Bacterial Isolates Having Heavy Oil Emulsifying Activity 4 mL of the inoculum of each of the purified bacterial isolates obtained from section B of this example was inoculated into 6 mL heavy oil (purchased from CPC Corporation, Taiwan), followed by shaking for 2 minutes. Then, the resultant mixture stood at room temperature for 24 hours to form an emulsified layer and an oil layer, and the heights of the emulsified layer and oil layer were measured. The experiment was repeated twice.

The Emulsification index $E_{24}$ was calculated using the following Equation (I):

$$A = (B/C) \times 100 \quad (I)$$

where A=emulsification index $E_{24}$ (%)
B=height of the emulsified layer (cm)
C=height of the oil layer (cm)

The higher the Emulsification index $E_{24}$, the higher the emulsifying activity of the bacterial isolate.

The results thus acquired show that among 35 bacterial isolates, the bacterial isolate S03 has excellent emulsifying activity for heavy oil (data not shown). Accordingly, the Inventors believe that the bacterial isolate S03 showed the greatest potential for treatment of crude petroleum, and thus was subjected to characteristics identification below.

Example 2. Characteristics Identification of the Bacterial Isolate S03

In order to identify the bacterial species of the bacterial isolate S03, the following as says were conducted: preliminary tests, fatty acid analysis, 16S rDNA sequence analysis, gyrB (subunit B of DNA gyrase) gene sequence analysis, and DNA-DNA hybridization analysis.

A. Preliminary Tests

The preliminary tests for the bacterial isolate S03 including gram staining, morphological observation, catalase activity, oxidase activity, mobility, and growth phenomium under aerobic and anaerobic environments were conducted by Food Industry Research and Development Institute (FIRDI).

According to the preliminary test results, the bacterial isolate S03 is a gram-negative bacilli, has catalase activity, does not have oxidase activity, has motility, is able to grow under aerobic condition but not under anaerobic condition, and is not able to generate endospores.

B. Fatty Acid Analysis

The fatty acid analysis for the bacterial isolate S03 was conducted using MIDI Sherlock® Microbial Identification System) (MIDI, Inc., Newark, Del., USA) by FIRDI.

The results of the fatty acid analysis are shown in Table 5, and indicates that the bacterial isolate S03 has $C_{18:1}$ ω7c and $C_{16:1}$ ω6c and/or $C_{16:1}$ ω7c as major fatty acids, $C_{16:0}$, $C_{10:0}$ 3OH, $C_{12:0}$ 2OH, and $C_{12:0}$ 3OH, and is in absence of $C_{16:0}$ 2OH and $C_{16:0}$ 3OH.

TABLE 5

| Fatty acid | Content (%) |
| --- | --- |
| $C_{18:1}$ ω7c | 29.91 |
| $C_{16:1}$ ω7c/$C_{16:1}$ ω6c | 29.01 |
| $C_{16:0}$ | 11.14 |
| $C_{12:0}$ | 9.71 |
| $C_{10:0}$ 3OH | 4.25 |
| $C_{12:0}$ 3OH | 3.87 |
| $C_{17:1}$ ω8c | 2.99 |
| $C_{17:1}$ ω6c | 1.44 |
| $C_{14:0}$ | 1.37 |
| $C_{17:0}$ cyclo | 0.91 |
| $C_{17:0}$ | 0.68 |
| $C_{13:0}$ | 0.66 |
| $C_{11:0}$ | 0.42 |
| $C_{15:1}$ ω6c | 0.41 |
| $C_{11:0}$ 3OH | 0.38 |
| $C_{13:0}$ iso | 0.30 |
| $C_{10:0}$ | 0.28 |
| $C_{17:0}$ iso | 0.27 |
| $C_{16:1}$ ω5c | 0.23 |
| $C_{19:1}$ ω6c | 0.23 |
| $C_{15:1}$ ω8c | 0.21 |

TABLE 5-continued

| Fatty acid | Content (%) |
| --- | --- |
| $C_{18:1}$ ω7c 11-methyl | 0.19 |
| $C_{11:0}$ iso 3OH | 0.16 |
| $C_{12:0}$ 2OH | 0.15 |
| $C_{18:0}$ | 0.15 |
| $C_{9:0}$ 3OH | 0.13 |
| $C_{14:1}$ ω5c | 0.11 |
| $C_{15:0}$ iso | 0.08 |
| $C_{13:0}$ 3OH/$C_{15:1}$ i H | 0.07 |
| $C_{19:0}$ cyclo ω8c | 0.07 |
| $C_{18:1}$ ω5c | 0.06 |
| $C_{17:1}$ iso ω9c | 0.05 |
| $C_{11:0}$ iso | 0.04 |
| $C_{12:1}$ 3OH | 0.04 |
| $C_{16:0}$ iso | 0.03 |

C. 16S rDNA Sequence Analysis

The 16S rDNA sequence analysis for the bacterial isolate S03 was conducted by FIRDI.

The partial 16S rDNA sequence of the bacterial isolate S03 (SEQ ID NO:1) is shown in FIG. 1, and was compared to 16S rDNA sequences of type strains of *Pseudomonas* genus from a gene database on the NCBI website. The results are shown in Table 6. It can be seen from Table 6 that the partial 16S rDNA sequence of the bacterial isolate S03 (SEQ ID NO:1) has high sequence similarity to the 16S rDNA sequence of each type strain of *Pseudomonas* spp., i.e., *Pseudomonas toyotomiensis*, *Pseudomonas oleovorans* subsp. *lubricantis*, *Pseudomonas alcaliphila*, *Pseudomonas mendocina*, *Pseudomonas composti*, and *Pseudomonas anguilliseptica*.

TABLE 6

| Type strain | Genbank Accession number | sequence similarity (%) |
| --- | --- | --- |
| *Pseudomonas toyotomiensis* HT-3[T] | AB453701 | 98.78 |
| *Pseudomonas oleovorans* subsp. *lubricantis* RS1[T] | DQ842018 | 98.68 |
| *Pseudomonas alcaliphila* AL15-21[T] | AB030583 | 98.64 |
| *Pseudomonas mendocina* LMG 1223[T] | Z76664 | 98.21 |
| *Pseudomonas composti* C2[T] | FN429930 | 97.82 |
| *Pseudomonas anguilliseptica* NCIMB 1949[T] | X99540 | 97.80 |
| *Pseudomonas indoloxydans* IPL-1[T] | DQ916277 | 97.77 |
| *Pseudomonas oleovorans* DSM 1045[T] | Z76665 | 97.55 |
| *Pseudomonas stutzeri* ATCC 17588[T] | CP002881 | 97.49 |
| *Pseudomonas putida* DSM 291[T] | Z76667 | 97.42 |
| *Pseudomonas plecoglossicida* FPC951[T] | AB009457 | 97.29 |
| *Pseudomonas taiwanensis* BCRC 17751[T] | EU103629 | 97.24 |
| *Pseudomonas benzenivorans* DSM 8628[T] | FM208263 | 97.22 |
| *Pseudomonas borbori* R-20821[T] | AM114527 | 97.22 |
| *Pseudomonas flavescens* B62[T] | U01916 | 97.22 |
| *Pseudomonas monteilii* CIP 104883[T] | AF064458 | 97.22 |
| *Pseudomonas punonensis* LMT03[T] | JQ344321 | 97.15 |

TABLE 6-continued

| Type strain | Genbank Accession number | sequence similarity (%) |
|---|---|---|
| Pseudomonas fuscovaginae MAFF 301177$^T$ | AB021381 | 97.15 |
| Pseudomonas xanthomarina KMM 1447$^T$ | AB176954 | 97.12 |
| Pseudomonas argentinensis CH01$^T$ | AY691188 | 97.08 |

Based on the identification results of sections A to C of this Example, the bacterial isolate S03 according to this disclosure is determined to be a strain of Pseudomonas spp. In order to further identify whether the bacterial isolate S03 is a novel Pseudomonas species, the following analyses were conducted.

D. gyrB Gene Sequence Analysis

The gyrB gene sequence analysis for the bacterial isolate S03 was conducted by FIRDI.

The partial gyrB gene sequence of the bacterial isolate S03 (SEQ ID NO:2) is shown in FIG. 2. In view of the results of section C of this Example, the six Pseudomonas spp. showing higher 16S rDNA sequence similarity to the bacterial isolate S03 were used for comparison in the gyrB gene sequence. The partial gyrB gene sequence of the bacterial isolate S03 (SEQ ID NO:2) was compared to gyrB gene sequences of type strains of the six Pseudomonas spp. from a gene database on the NCBI website. The results are shown in Table 7. It can be seen from Table 7 that the partial gyrB gene sequence of the bacterial isolate S03 has low sequence similarity to the gyrB gene sequence of each of the type strains.

TABLE 7

| Type strain | Genbank Accession number | sequence similarity (%) |
|---|---|---|
| Pseudomonas toyotomiensis HT-3$^T$ | AB494447 | 86.87 |
| Pseudomonas oleovorans subsp. lubricantis RS1$^T$ | EF675630 | 86.87 |
| Pseudomonas alcaliphila JCM 10630$^T$ | AB494446 | 85.46 |
| Pseudomonas mendocina ATCC 25411$^T$ | AJ633103 | 85.66 |
| Pseudomonas composti C2$^T$ | HE800474 | 86.33 |
| Pseudomonas anguilliseptica LMG 21629$^T$ | FN554168 | 86.91 |

E. DNA-DNA Hybridization Analysis

The DNA-DNA hybridization analysis for the bacterial isolate S03 was conducted by FIRDI using nine type strains of Pseudomonas spp. purchased from BCRC of FIRDI, i.e., Pseudomonas toyotomiensis, Pseudomonasoleovorans subsp. lubricantis, Pseudomonas alcaliphila, Pseudomonas mendocina, Pseudomonas composti, Pseudomonas anguilliseptica, Pseudomonas benzenivorans, Pseudomonas oryzihabitans, and Pseudomonas japonica to obtain a DNA relatedness value between each of the type strains and the bacterial isolate S03.

The results are shown in Table 8. It can be seen from Table 8 that the DNA relatedness values between the bacterial isolate S03 and each of the nine strains is below 60%. The results indicate that the bacterial isolate S03 shows a distant relatedness to each of the type strains.

TABLE 8

| Type strain | DNA relatedness value (%) with the bacterial isolate S03 |
|---|---|
| Pseudomonas toyotomiensis BCRC 80682T | 51 |
| Pseudomonas oleovorans subsp. lubricantis BCRC 80656$^T$ | 59 |
| Pseudomonas alcaliphila BCRC 80654$^T$ | 51 |
| Pseudomonas mendocina BCRC 10458$^T$ | 35 |
| Pseudomonas composti BCRC 80701$^T$ | 59 |
| Pseudomonas anguilliseptica BCRC 80691$^T$ | 58 |
| Pseudomonas benzenivorans BCRC 80692$^T$ | 47 |
| Pseudomonas oryzihabitans BCRC 16007$^T$ | 39 |
| Pseudomonas japonica BCRC 80101$^T$ | 19 |

Based on the aforesaid results, and further reference to certain related references such as Satoshi Yamamoto et al. (1995), *Applied and Environmental Microbiology*, 61:1104-1109 and Li-Ting Wang et al. (2010), *International Journal of Systematic and Evolutionary Microbiology*, 60:2094-2098, the bacterial isolate S03 of this disclosure was determined by the Inventors to be a novel Pseudomonas species, named as Pseudomonas taoyuanensis S03, and deposited in the Deutsche Sammlung von Mikroorganismen and Zellkulturen (DSMZ) under an accession number DSM 32185 on Oct. 14, 2015.

Example 3. Evaluation for Diesel Emulsifying Activity of Pseudomonas taoyuanensis S03

In this example, the evaluation for diesel emulsifying activity of Pseudomonas taoyuanensis S03 was performed substantially according to the procedures as set forth in section C of Example 1, except that super diesel (purchased from CPC Corporation, Taiwan) was used in place of heavy oil.

The Emulsification index $E_{24}$ thus determined is 105%. The result shows that Pseudomonas taoyuanensis S03 has excellent emulsifying activity for super diesel.

Example 4. Effect of Pseudomonas taoyuanensis S03 on Scavenging Benzene and Naphthalene Experimental Materials:

1. De-Oxygenated Water:

9 mg $Na_2SO_3$ and 1 mg $CoCl_2$ were added to 1 L sterilized water, followed by mixing homogeneously and reacting at room temperature for 2 minutes to obtain de-oxygenated water, simulating groundwater that flows through the soil.

2. Simulated Column Apparatus:

A simulated column apparatus used in this experiment includes an upright cylindrical column having a length of 30 cm and an inner diameter of 5 cm, two Teflon plugs for respectively sealing top and bottom ends of the column, a peristaltic pump (Model 323U, WATSON-MARLOW) connected to the column through the Teflon plug at the bottom end of the column for pumping de-oxygenated water into the column, and a conduit connected to the column through the Teflon plug at the top end of the column for collecting effluent from the column.

3. Benzene-Containing Soil Sample:

A soil sample collected from benzene-contaminated soil in a remediation site in Miaoli county (collected at a depth of about 5 meters below the soil surface) was crushed with a mallet. The crushed soil sample was air-dried for 7 to 10 days, and was then filtered with a filter having a pore size of 0.85 mm. The filtered soil sample was determined to have 1231.1 mg/kg of benzene based on the method as described in the previous section of "General Experimental Procedure", followed by storage at −80° C. for further use.

4. Naphthalene-Containing Soil Sample:

A soil sample collected from naphthalene-contaminated soil in a remediation site in Kaohsiung city (collected at a depth of about 1 meter below the soil surface) was crushed with a mallet. The crushed soil sample was air-dried for 7 to 10 days, and was then filtered with a filter having a pore size of 0.85 mm. The filtered soil sample was determined to have 191.7 mg/kg of naphthalene based on the method as described in the previous section of "General Experimental Procedure", followed by storage at −80° C. for further use.

Experimental Procedures:

A. Scavenging Ability of *Pseudomonas taoyuanensis* S03 for Benzene in the Soil Sample The bottom end of the upright cylindrical column was covered with gauze and sealed with one of the Teflon plugs. The upright cylindrical column was packed with glass beads having diameters of 0.1 cm, 0.2 cm, and 0.5 cm from the bottom end to the top end as a bottom layer with a height of 2 cm, 653.85 g of the benzene-containing soil sample having a benzene concentration of 1231.1 mg/kg as an intermediate layer with a height of 20 cm, and glass beads having diameters of 0.5 cm, 0.2 cm, and 0.1 cm from the bottom end to the top end as a top layer with a height of 2 cm. The top end of the upright cylindrical column was then sealed with the other Teflon plug.

The de-oxygenated water was pumped into the column through the bottom end of the column using the peristaltic pump at a flow rate of 0.2 mL/min. As the effluent steadily flowed out of the column through the conduit, a suitable amount of calcium peroxide (1000 mg/L) was pumped into the column using the peristaltic pump to adjust the dissolved oxygen (DO) of the soil sample packed in the column. Subsequently, a suitable amount of *Pseudomonas taoyuanensis* S03 was pumped into the column using the peristaltic pump, such that the concentration of *Pseudomonas taoyuanensis* S03 in the soil sample was $1 \times 10^5$ CFU/g. Furthermore, a benzene-containing soil sample without *Pseudomonas taoyuanensis* S03 was used as a control group and was subjected to the same procedure.

The effluent was collected, and was then subjected to the detection of DO and pH value using a DO meter (Model D0200, CLEAN) and a pH meter respectively. The DO and pH value of soil sample are deemed to be equal to the DO and pH value of the effluent thus detected. The experiment was performed for 15 days. During the experiment, the DO of the effluent was adjusted to be in the range of 6 to 7 mg/L and the pH value of the effluent was controlled to be in a range of 6.0 to 7.5 so as to provide favorable growth conditions in the soil sample for *Pseudomonas taoyuanensis* S03.

Furthermore, the effluent was subjected to detection of benzene concentration based on methods as described in the previous section of "General Experimental Procedure", and the detected concentration of benzene was multiplied by the volume of the effluent to obtain the benzene content (g) in the effluent.

At the end of the experiment, the benzene content in the effluent which was measured daily was summed up to obtain the total benzene content in the effluent. Furthermore, a suitable amount of the soil sample in the column was subjected to detection of the concentration of benzene based on methods as described in the previous section of "General Experimental Procedure", and the detected concentration of benzene was multiplied by the weight of the soil sample to obtain the remaining benzene content in the soil sample. Similarly, the initial benzene content in the soil sample (g) was calculated before the experiment was performed.

Benzene clearance rate (%) and benzene degradation rate (%) were calculated using the following Equations (II) and (III) respectively:

$$D=(E-F)/E \times 100 \tag{II}$$

where D=Benzene clearance rate (%)
E=Initial benzene content in the soil sample (g)
F=Remaining benzene content in the soil sample (g)

$$G=(E-F-H)/E \times 100 \tag{III}$$

where G=Benzene degradation rate (%)
E=Initial benzene content in the soil sample (g)
F=Remaining benzene content in the soil sample (g)
H=Total benzene content in the effluent (g)

B. Scavenging Ability of *Pseudomonas taoyuanensis* S03 for Naphthalene in the Soil Sample The scavenging ability of *Pseudomonas taoyuanensis* S03 for naphthalene in the soil sample was determined substantially according to the procedures as set forth in section A of this example, except that the naphthalene-containing soil sample was used in place of the benzene-containing soil sample.

Naphthalene clearance rate (%) and naphthalene degradation rate (%) were calculated using the following Equations (IV) and (V) respectively:

$$I=(J-K)/J \times 100 \tag{IV}$$

where I=Naphthalene clearance rate (%)
J=Initial naphthalene content in the soil sample (g)
K=Remaining naphthalene content in the soil sample (g)

$$L=(J-K-M)/J \times 100 \tag{V}$$

where L=Naphthalene degradation rate (%)
J=Initial naphthalene content in the soil sample (g)
K=Remaining naphthalene content in the soil sample (g)
M=Total naphthalene content in the effluent (g)

Results:

A. Scavenging Ability of *Pseudomonas taoyuanensis* S03 for Benzene in the Soil Sample The benzene clearance rate of *Pseudomonas taoyuanensis* S03 is shown in FIG. 3. It can be seen from FIG. 3 that the benzene clearance rate of *Pseudomonas taoyuanensis* S03 (about 95%) is significantly higher than that of the control group. The results indicate that *Pseudomonas taoyuanensis* S03 is effective in scavenging benzene present in soil.

Figure 4:
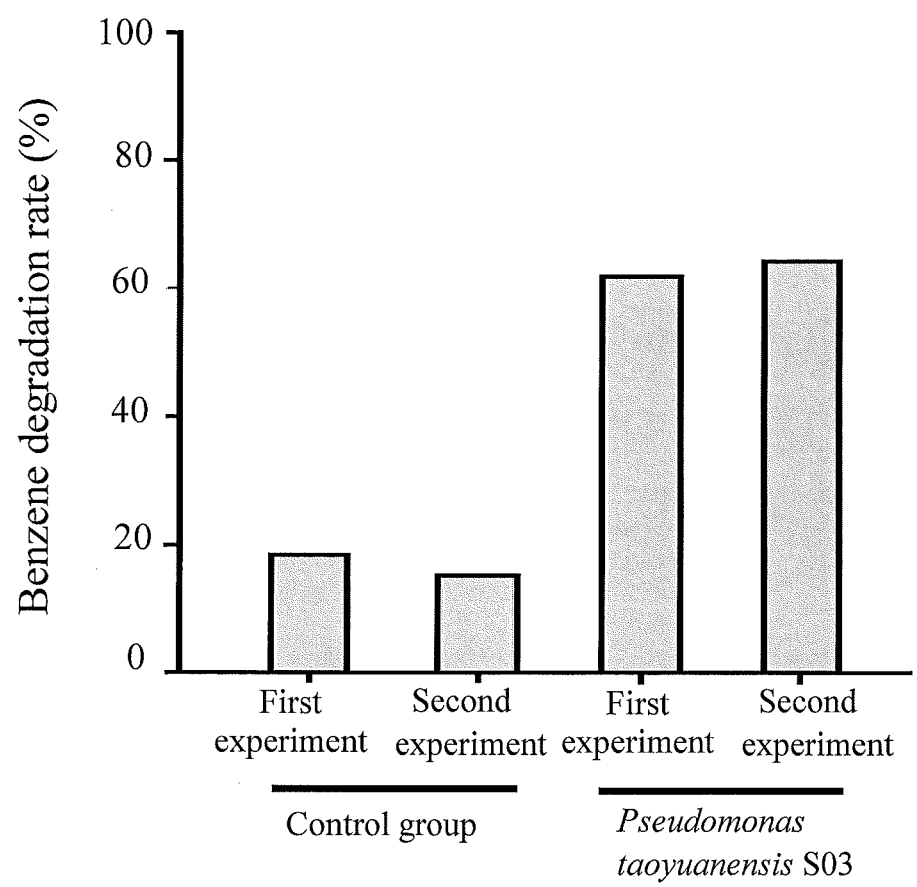
FIG. 4 shows the benzene degradation rate of *Pseudomonas taoyuanensis* S03 for a benzene-containing soil sample, wherein the control group represents treatment of a benzene-containing soil sample without using *Pseudomonas taoyuanensis* S03.

The benzene degradation rate of *Pseudomonas taoyuanensis* S03 is shown in FIG. 4. It can be seen from FIG. 4 that the benzene degradation rate of *Pseudomonas taoyuanensis* S03 (about 60%) is significantly higher than that of the control group. The results indicate that *Pseudomonas taoyuanensis* S03 has excellent benzene degrading ability.

Based on the results of FIGS. 3 and 4, it is revealed that *Pseudomonas taoyuanensis* S03 can scavenge benzene present in soil by desorption and degradation.

Figure 5:
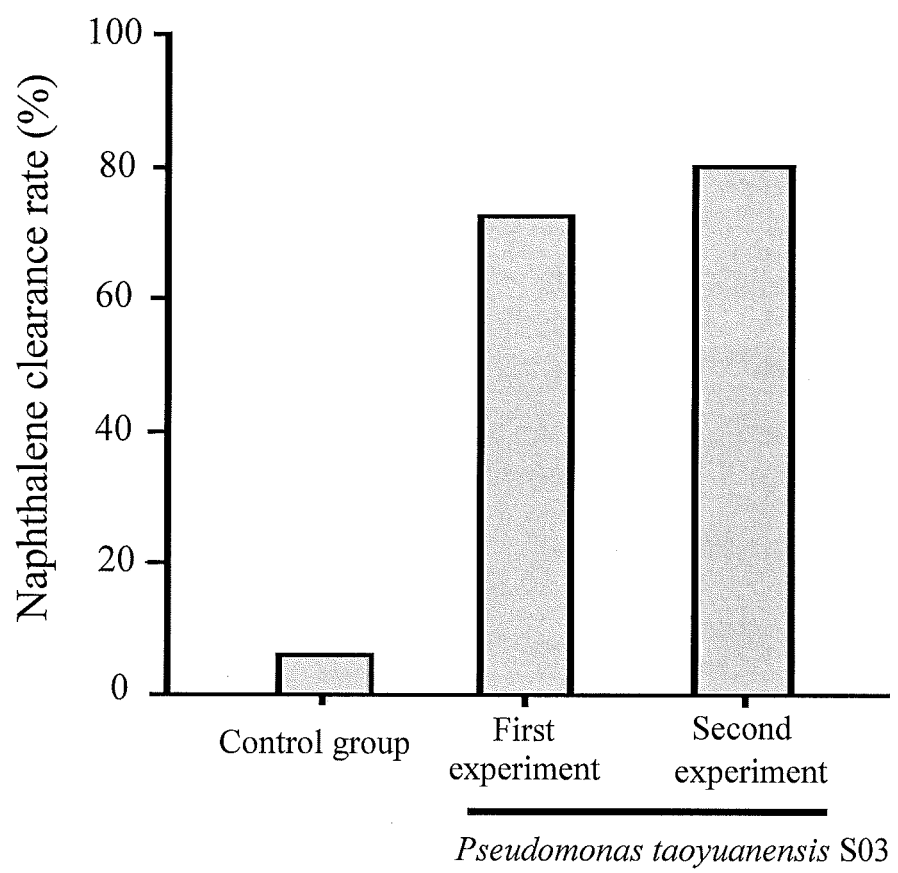
FIG. 5 shows the naphthalene clearance rate of *Pseudomonas taoyuanensis* S03 for a naphthalene-containing soil sample, wherein the control group represents treatment of a naphthalene-containing soil sample without using *Pseudomonas taoyuanensis* S03.

B. Scavenging Ability of *Pseudomonas taoyuanensis* S03 for Naphthalene in the Soil Sample The naphthalene clearance rate of *Pseudomonas taoyuanensis* S03 is shown in FIG. 5. It can be seen from FIG. 5 that the naphthalene clearance rate of *Pseudomonas taoyuanensis* S03 (between 72% and 80%) is significantly higher than that of the control group. The results indicate that *Pseudomonas taoyuanensis* S03 is effective in scavenging naphthalene present in soil.

Figure 6:
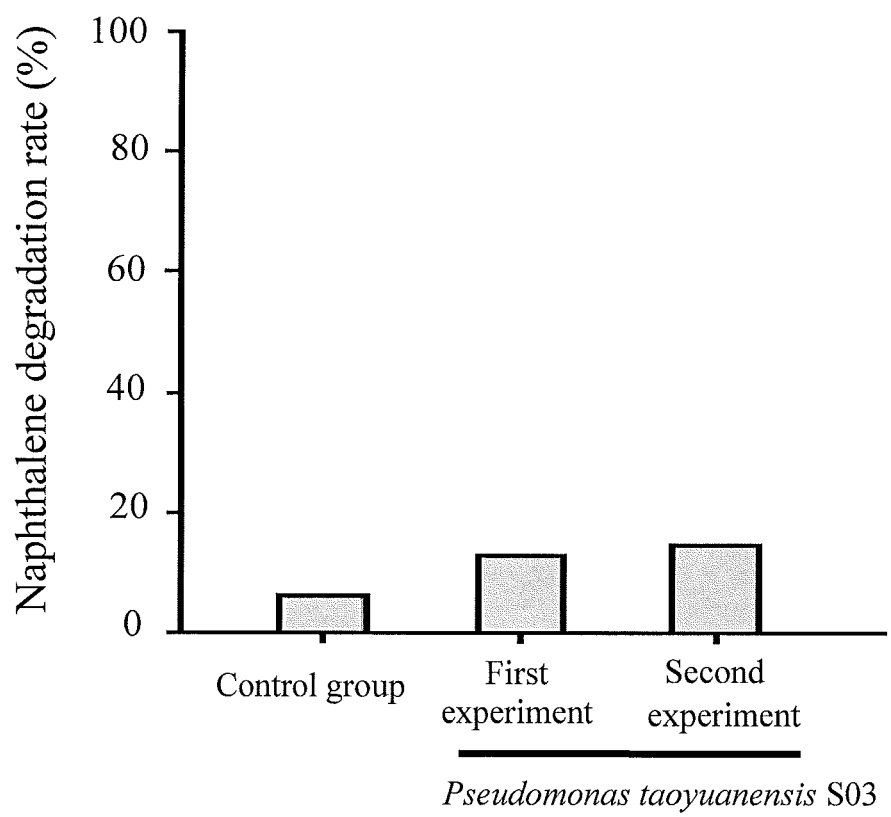
FIG. 6 shows the naphthalene degradation rate of *Pseudomonas taoyuanensis* S03 for a naphthalene-containing soil sample, wherein the control group represents treatment of a naphthalene-containing soil sample without using *Pseudomonas taoyuanensis* S03.

The naphthalene degradation rate of *Pseudomonas taoyuanensis* S03 is shown in FIG. 6. It can be seen from FIG. 6 that the naphthalene degradation rate of *Pseudomonas taoyuanensis* S03 is slightly higher than that of the control group.

It can be seen from FIGS. 5 and 6 that the naphthalene clearance rate of *Pseudomonas taoyuanensis* S03 is significantly higher than the naphthalene degradation rate, indicating that the effect of *Pseudomonas taoyuanensis* S03 on scavenging naphthalene in soil is reached mainly via desorbing naphthalene from the soil sample into the effluent.

In view of the foregoing, *Pseudomonas taoyuanensis* S03 has excellent emulsifying activity, and is effective in scavenging benzene, naphthalene, toluene, ethylbezene, or xylene present in soil by desorption and degradation so as to achieve bioremediation. Accordingly, *Pseudomonas taoyuanensis* S03 of the present disclosure is expected to have potential in developing a microbial agent for use in scavenging crude petroleum, a petroleum refined product (e.g. diesel and heavy oil), benzene, naphthalene, toluene, ethylbezene, or xylene in a contaminated substrate.

All the patents and references cited in this specification are incorporated herein in their entirety as reference. When there is conflict, the detailed descriptions in this case, including the definitions, would prevail.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

SEQUENCE LISTING

```
<160> NUMBER OF SEQ ID NOS: 2

<210> SEQ ID NO 1
<211> LENGTH: 1489
<212> TYPE: DNA
<213> ORGANISM: Pseudomonas taoyuanensis S03

<400> SEQUENCE: 1
attgaacgct ggcggcaggc ctaacacatg caagtcgagc ggatgagagg agcttgctcc      60
ttgatttagc ggcggacggg tgagtaatgc ctaggaatct gcctggtggt gggggataac     120
gttccgaaag gaacgctaat accgcatacg tcctacggga gaaagcgggg gatcttcgga     180
cctcgcgcca ttagatgagc ctaggtcgga ttagctagtt ggtgaggtaa cggctcacca     240
aggcgacgat ccgtaactgg tctgagagga tgatcagtca cactggaact gagacacggt     300
ccagactcct acgggaggca gcagtgggga atattggaca atgggcgaaa gcctgatcca     360
gccatgccgc gtgtgtgaag aaggtcttcg gattgtaaag cactttaagt tgggaggaag     420
ggtattcacc taatacgtga gtattttgac gttaccgaca gaataagcac cggctaactt     480
cgtgccagca gccgcggtaa tacgaagggt gcaagcgtta atcggaatta ctgggcgtaa     540
agcgcgcgta ggtggttcgt taagttggat gtgaaagccc cgggctcaac ctgggaactg     600
catccaaaac tggcgagcta gagtacggta gagggtggtg gaatttcctg tgtagcggtg     660
aaatgcgtag atataggaag gaacaccagt ggcgaaggcg accacctgga ctgatactga     720
cactgaggtg cgaaagcgtg gggagcaaac aggattagat accctggtag tccacgccgt     780
aaacgatgtc aactagccgt tggaatcctt gagattttag tggcgcagct aacgcattaa     840
gttgaccgcc tggggagtac ggccgcaagg ttaaaactca aatgaattga cggggcccg     900 cacaagcggt ggagcatgtg gtttaattcg aagcaacgcg aagaaccttta cctggccttg     960 acatgctgag aactttccag agatggattg gtgccttcgg gaactcagac acaggtgctg    1020
catggctgtc gtcagctcgt gtcgtgagat gttgggttaa gtcccgtaac gagcgcaacc    1080
cttgtcctta gttaccagca cgtgatggtg gcactctaa ggagactgcc ggtgacaaac     1140
cggaggaagg tggggatgac gtcaagtcat catggccctt acggccaggg ctacacacgt    1200
gctacaatgg tcggtacaaa gggttgccaa gccgcgaggt ggagctaatc ccataaaacc    1260
```

-continued

```
gatcgtagtc cggatcgcag tctgcaactc gactgcgtga agtcggaatc gctagtaatc      1320
gtgaatcaga atgtcacggt gaatacgttc ccgggccttg tacacaccgc ccgtcacacc      1380
atgggagtgg gttgctccag aagtagctag tctaaccttc gggggacgg ttaccacgga       1440 gtgattcatg actggggtga agtcgtaaca aggtagccgt aggggaacc                 1489

<210> SEQ ID NO 2
<211> LENGTH: 995
<212> TYPE: DNA
<213> ORGANISM: Pseudomonas taoyuanensis S03

<400> SEQUENCE: 2
tgcatggcgt gccccaggcg ccgctggccg ccgttggtga caccgaaggc accggcacgc       60
agattcattt caagccctcg gaagaaacct tccacaatat ccactttagc tgggacatcc      120
tggccaagcg ccttcgcgaa ctgtccttcc tcaactccgg cgtcggcatc ctgctcaagg      180
acgaacgcag cggcaaggaa gaactgttca agtacgaggg cggtctgcgc gccttcgtcg      240
agtacctcaa ccacaacaag accacggtca accaggtgtt ccacttcaac gtgcagcgcg      300
acgatggcgt cggcgtggaa gtggccctgc agtggaacga cagcttcaac gagaacctgt      360
tgtgcttcac caacaacatt ccccagcgcg acggcggcac ccacctcgcc ggcttccgct      420
cggcgctgac gcgtaacctc aacacctata tcgagcagga aggcctggcc aagaagttca      480
aggtcagcac caccggcgac gatgcccgcg aaggcctgac cgcgatcatc tcggtcaagg      540
tgccggaccc gaaattcagc tcgcagacca aggacaagct ggtctccagc gaagtgaaga      600
ccgcggtcga acaggaaatg ggcaagtact tcgccgactt cctgctggaa aatcccaacg      660
aagccaaggc cgtggtcggc aagatgatcg acgctgcccg cgcccgcgaa gccgcgcgca      720
aggcccgcga gatgacccgc cgcaagggcg cgctggatat cgccgggctg cccggcaagc      780
tggccgactg ccaggaaaag gacccggcgc tgtccgaact ctacatagtg gagggtgact      840
ccgcgggcgg ttctgccaag cagggccgca accgcaggac ccaggcgatc ctgccgctca      900
agggcaagat cctcaacgtg gaaaagccc gcttcgacaa gatgctctcc tcccaggaag      960
tcggcaccct gatcaccgcg ctcggctgcg gtatc                                995
```

What is claimed is:

1. A method for scavenging aromatic hydrocarbons present in a contaminated substrate, comprising treating the contaminated substrate with *Pseudomonas taoyuanensis* S03 deposited in DSMZ under accession number DSM 32185, such that the aromatic hydrocarbons present in the contaminated substrate are degraded or desorbed from the contaminated substrate by the *Pseudomonas taoyuanensis* S03, the aromatic hydrocarbons being selected from the group consisting of benzene, naphthalene, toluene, ethylbenzene, xylene, and combinations thereof.

2. The method of claim 1, wherein the aromatic hydrocarbons are selected from the group consisting of benzene, naphthalene, and the combination thereof.

3. The method of claim 1, wherein the contaminated substrate is selected from the group consisting of soil, sludge, sediment, aquifer, and water.

4. The method of claim 3, wherein the contaminated substrate is selected from the group consisting of plowland, orchard land, grazing grassland, woodland, gas station land, industrial land, well water, an aquaculture pond, ground water, river water, lake water, seawater, industrial waste water, domestic sewage, and silt.

5. A method for scavenging crude petroleum or a refined product thereof present in a contaminated substrate, comprising treating the contaminated substrate with *Pseudomonas taoyuanensis* S03 deposited in DSMZ under accession number DSM 32185, such that the crude petroleum or the refined product thereof is emulsified by the *Pseudomonas taoyuanensis* S03.

6. The method of claim 5, wherein the refined product is selected from the group consisting of heavy oil, diesel, kerosene, gasoline, hydraulic oil, and lubricating oil.

7. The method of claim 5, wherein the contaminated substrate is selected from the group consisting of soil, sludge, sediment, aquifer, and water.

8. The method of claim 7, wherein the contaminated substrate is selected from the group consisting of plowland, orchard land, grazing grassland, woodland, gas station land, industrial land, well water, an aquaculture pond, ground water, river water, lake water, seawater, industrial waste water, domestic sewage, and silt.

* * * * *